Aug. 2, 1960     T. R. SILVERBERG ET AL     2,947,473
SINE AND COSINE RESOLVER
Filed Jan. 3, 1956

INVENTORS
T.R. SILVERBERG and S.D. LEWIS
BY
Wade Koontz
Sherman H. Goldman
ATTORNEYS

United States Patent Office 2,947,473
Patented Aug. 2, 1960

2,947,473

SINE AND COSINE RESOLVER

Thomas R. Silverberg, West Concord, and Sumner D. Lewis, Westwood, Mass., assignors to the United States of America as represented by the Secretary of the Air Force Filed Jan. 3, 1956, Ser. No. 557,216

1 Claim. (Cl. 235—61)

This invention relates to linkage computers and more particularly to a sine and cosine resolver which utilizes a modification of Scott Russell linkages in combination with a linkage which generates the sine and cosine of an angle.

An object of this invention is the production of a sine and cosine resolver comprising a rotating crank in combination with a pair of modified Scott Russell linkages.

A further object of the invention is the production of a sine and cosine resolver wherein, for a rotary input measured from a convenient reference line, either or both the sine and cosine functions are generated continuously as slide outputs, or conversely, if the sine and cosine of an angle are introduced on the slides as inputs, the rotary output would read the angle. For an input of either sine or cosine, the resolver will deliver as outputs the angle and the cosine or sine of the angle, whichever was not the original input, for limited sine or cosine input.

Another object of the invention is the provision of a computer linkage which may be used as an element of a machine which performs further computations.

Another object of the invention is the provision of a computer linkage which attains a high degree of accuracy, operates smoothly, is easily constructed, and is inexpensive to produce.

Figure 1:
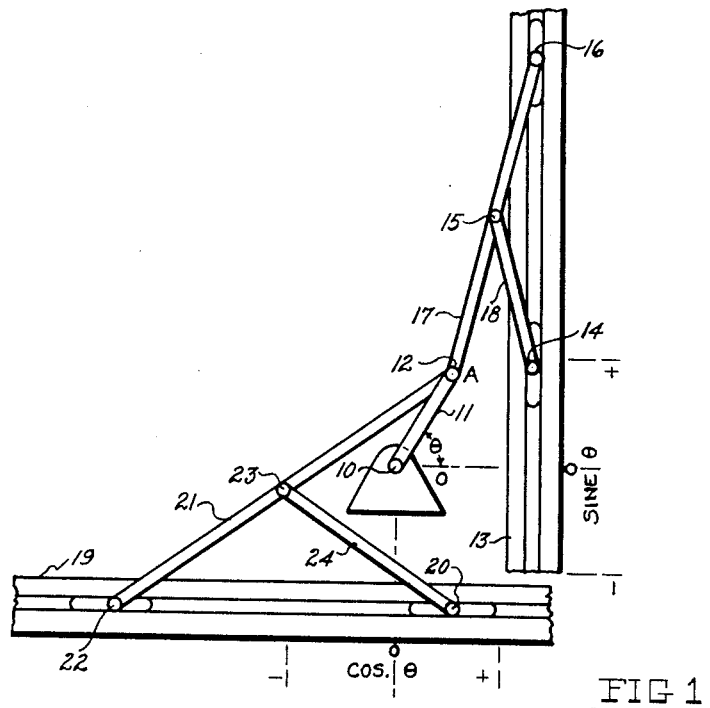
Figure 2:
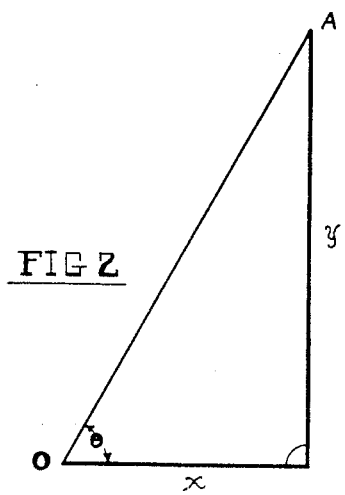

These and other advantages, features and objects of the invention will become more apparent from the following description taken in connection with the illustrative embodiment in the accompanying drawings, wherein:

Fig. 1 is an illustrative schematic diagram of a sine and cosine resolver; and Fig. 2 is a diagrammatic illustration of the principle of the invention of Fig. 1.

In Fig. 1 elements 12 through 18 comprise a modified Scott Russell linkage and differ from a true Scott Russell linkage in that pivot 14 has been made slidable. A typical Scott Russell linkage is explained and shown in "Applied Kinematics," 2nd ed., by J. Harland Billings, published by D. Van Nostrand Co. Inc., on pages 61 and 62.

The sine and cosine resolver of Fig. 1 utilizes a rotary input measured from a convenient reference line so that both the sine and cosine functions are generated continuously as slide outputs. The fixed pivot 10 provides the zero reference lines while crank 11 with pivot point 12 at the end opposite to 10 generates both the sine and cosine of the angle $\theta$. The sine and cosine, as represented by pivot 12, are transferred to fixed guides 13 and 19 by means of a pair of modified Scott Russell linkages. The sine output of pivot 12 is transferred to sliding pivot 14 in guide 13 by means of a sliding pivot 16 in guide 13 which is connected to a pivot 12 by link 17 whose center point contains a pivot 15 for link 18 which joins pivot 15 with sliding pivot 14. The cosine output of 12 is transferred to sliding pivot 20 in guide 19 by means of a sliding pivot 22 in guide 19 which is connected to pivot 12 by a link 21 whose center point contains a pivot 23 for a link 24 which joins pivot 23 with sliding pivot 20.

From the geometry of the device as illustrated in Fig. 2 OA equals a constant which is unity. The sine $\theta$, therefore, equals $$\frac{y}{1}$$

or $y$, while the cosine $\theta$ would equal $$\frac{x}{1}$$

or $x$. Accordingly, the crank 11 may be set at a desired angle, and the position of pivots 14 and 20 would represent the sine and cosine, respectively, of the angle. Conversely, either the sine or cosine may be inserted by positioning either of links 14 or 20 and the angle $\theta$ can be determined from the position of crank 11 for limited inputs.

Although the invention has been described with reference to a particular embodiment, it will be understood to those skilled in the art that the invention is capable of a variety of alternative embodiments within the spirit and scope of the appended claims.

We claim:

A sine and cosine resolver comprising a crank pivotally connected at one end to a fixed support and adapted to be rotated to a predetermined angle from a reference line through said pivotal connection, a pair of linkages, each of said pair of linkages comprising a first link having one end pivotally connected at a common point with the other end of said crank, and a second link having one end pivotally connected to the midpoint of said first link, a pair of fixed guides in a perpendicular relationship to each other, the other end of said first link and the other end of said second link of each of said pair of linkages being pivotally and slidably connected with a guide such that the vertical distance of the pivotal connection of said linkages on said other end of said crank from said reference line is transferred to the pivotal and slidable connection of the second link of one of said pair of linkages on one of said guides, and the horizontal distance of the pivotal connection of said linkages on said other end of said crank to said first-mentioned pivotal connection is transferred to the pivotal and slidable connection of the second link of the other of said pair of linkages on the other of said guides, said linkages being arranged such that a line through the pivotal and slidable connection of each of said second links and said linkage connecting point with said crank always forms a perpendicular with the guide containing said last-mentioned pivotal and slidable connection.

References Cited in the file of this patent

UNITED STATES PATENTS

| | | |
|---|---|---|
| 2,022,275 | Davis | Nov. 26, 1935 |
| 2,066,949 | Ruiz | Jan. 5, 1937 |
| 2,080,186 | Reymond | May 11, 1937 |
| 2,652,195 | Nickson | Sept. 15, 1953 |

FOREIGN PATENTS

| | | |
|---|---|---|
| 1,014,463 | France | July 31, 1939 |
| 498,999 | Great Britain | Jan. 17, 1939 |